United States Patent [19]
Mesnel et al.

[11] Patent Number: 5,199,154
[45] Date of Patent: Apr. 6, 1993

[54] METHOD FOR PUTTING A U-SECTION PROFILE IN PLACE ON A RIM OF A FRAME OF A MOTOR VEHICLE BODY

[75] Inventors: Gérard Mesnel; François Mesnel, both of Carrieres-Sur-Seine, France

[73] Assignee: Establissements Mesnel, Carrieres-Sur-Seine, France

[21] Appl. No.: 880,287

[22] Filed: May 4, 1992

Related U.S. Application Data

[63] Continuation of Ser. No. 609,438, Nov. 5, 1990, abandoned.

[30] Foreign Application Priority Data

Apr. 5, 1990 [FR] France .................... 90 04357
Jul. 5, 1990 [FR] France .................... 90 08547

[51] Int. Cl.$^5$ .................. B23P 17/00; B23P 21/00
[52] U.S. Cl. .................... 29/451; 29/243.58; 29/821
[58] Field of Search .............. 29/243.58, 509, 417, 29/450, 451, 514, 235, 821; 414/744 A

[56] References Cited

U.S. PATENT DOCUMENTS

| | | | |
|---|---|---|---|
| 4,620,354 | 11/1986 | Hess et al. | 29/417 |
| 4,653,166 | 3/1987 | Bright | 29/451 |
| 4,760,636 | 8/1988 | St. Angelo, Jr. et al. | 29/451 X |
| 4,996,756 | 3/1991 | Bright et al. | 29/243.58 |

FOREIGN PATENT DOCUMENTS 0253599  1/1988  European Pat. Off. .
2626054  1/1988  France .

Primary Examiner—Mark Rosenbaum
Assistant Examiner—Peter Dungba Vo
Attorney, Agent, or Firm—Scully, Scott, Murphy & Presser

[57] ABSTRACT

The invention relates to a method for putting in place, on a projecting rim of a motor vehicle body element, a U-section profile (1) comprising a metal reinforcement sheathed with a resilient material, this reinforcement being substantially undeformable over time under the stress of the covering material.

According to the invention, a length of profile (1) is used which is substantially equal to that of the body element (2) to be equipped, a predetermined and possibly marked part of the profile is initially fastened in position at a predetermined, possibly marked, location (4) of the rim of the body element and, subsequently, with the aid of a vibrating flexible-headed mallet (7) driven in an alternating striking movement, the profile is applied continuously against the rim of the body element starting from said predetermined location (4) as far as a first end of the profile and then, again starting from said predetermined location, as far as the other end of the profile.

17 Claims, 4 Drawing Sheets

METHOD FOR PUTTING A U-SECTION PROFILE IN PLACE ON A RIM OF A FRAME OF A MOTOR VEHICLE BODY

This is a continuation of copending application Ser. No. 609,438 filed on Nov. 4, 1990 now abandoned.

BACKGROUND OF THE INVENTION

The present invention relates to a method and a device for putting a U-section profile in place on a rim of a frame of a motor vehicle body or the like. The invention relates more particularly to the putting in place, on frames of motor vehicle doors or onto edges of openings of motor vehicle trunks, of weatherseals comprising such a profile forming a clamp, made from reinforced plastic material, and a sealing element adjoining this profile.

It is known that such seals usually comprise a U-section profile, comprising a metal reinforcement sheathed with a flexible material such as rubber or a plastic material, this profile being intended to be fixed by clamping onto a projecting edge or a projecting part of a motor vehicle body. This profile is associated with a flexible sealing element, for example tubular, intended to be compressed between two parts of the body, a door and its frame for example.

Numerous alternative embodiments of such profiles have been described in the prior art but, because the metal reinforcement of these profiles can be deformed and because the covering material can contract after the profile has been put in place on the associated body element, even when a profile in the form of a ring is used, the ends of which are connected to each other, a profile is usually used whose length is greater than that of the body element to be equipped, and it is put in position by compressing it slightly against this element. To this end, the ring profile is first fixed manually, using a flexible-headed mallet, at different points of the element of the body, between which it forms loops (so-called "looped" or "festooned" fitting). The profile is then put in place on the remainder of the body element, by continuously applying blows with a mallet between the initial fastening points, in order to cause the profile to clamp onto the body element over its entire length. Since the profile is to start with longer than the body element by a few tens of millimeters (generally 30 to 35 mm), the excess plastic material or rubber forming the clamp is thus forced into position by compression.

The longitudinal squeezing by approximately 10% to 15% of the sealing element adjoining the profile forming a clamp, which sealing element is generally made from a cellular material, makes it harder to deform than if it had not been subjected to the stress of putting the profile in place. It is then consequently difficult to close motor vehicle doors and trunks.

In addition to this disadvantage, this procedure for putting weatherseals in position on door frames or trunk openings makes use of an excess amount of raw material and is expensive in terms of personnel since a qualified worker takes several minutes to equip a door frame with the associated seal.

SUMMARY OF THE INVENTION

The object of the invention is to make good use of the appearance on the market of U-section profiles whose structure is such that their length is virtually invariable, under the stress of the contraction of the plastic material or during the fitting operations, both when in storage and after having been put in place on a body element, and it proposes to use, for this placing, a method which uses only a length of profile substantially equal to that of the body element to be equipped and which can be employed with the aid of an automated apparatus which does not entail the direct intervention of a worker.

To this end, the subject of the invention is a method for putting in place, on a projecting rim of a frame of a motor vehicle body, a U-section profile comprising a substantially non-extendable metal reinforcement sheathed with a resilient material, this reinforcement being substantially undeformable over time under the stress of the covering material, wherein a length of profile is used which is substantially equal to that of the body frame to be equipped, wherein a predetermined and possibly marked part of the profile is initially fastened in position at a predetermined, possibly marked, location of the rim of the body frame, and wherein, subsequently, with the aid of a vibrating flexible-headed mallet driven in an alternating striking movement, the profile is applied continuously against the rim of the body frame, starting from said predetermined location as far as a first end of the profile, and then, starting again from said predetermined location, as far as the other end of the profile.

It will be possible for the positioning of a predetermined part of the profile at a predetermined location of the body frame to be carried out manually or with the aid of the mallet with a vibrating head, or alternatively with the aid of a robot. In the case of a door frame, the predetermined location of the body element will preferably be situated in the top corner of the frame, contiguous to the corresponding central pillar of the body. In the case of a trunk opening, the predetermined location of the body frame will preferably be situated in either of the corners of the opening which are closest to the rear window of the vehicle.

The ends of the profile will preferably be joined together beforehand by means known from the prior art (by welding/adhesive bonding or welding/vulcanization of the plastic material and of the rubber, or using clips or the like) so that the profile forms a ring, as in the prior art technique of the "looped" fitting of the profile. In the case of a door frame, the joining point of the two ends will be situated at the base of the door frame, preferably in the mid part of this base, or alternatively in the part of this frame arranged facing the central pillar. In the case of a trunk opening, the joining point of the two ends of the profile will be situated on that edge of the opening arranged at the rear of the vehicle, preferably in the mid part of this edge.

In such embodiments of the invention, the vibrating flexible-headed mallet can follow a continuous path in a same direction, from the initial fastening point of the profile at a predetermined location of the rim of the body frame as far as its starting point, following a continuous path over the entire length of the body element, and the mallet with a vibrating head can also follow a first path from the initial fastening point of the profile at a predetermined location of the rim of the body frame as far as any point whatsoever of this element, and then return to the initial fastening point in order to follow a second path in the revers direction to the first as far as the point of the profile where it had stopped previously.

It will be possible for the initial putting of a part of the profile in place at a predetermined location of the rim of the body frame to be carried out manually or using a mallet with a vibrating head. It will also be possible for it to be effected by a different tool, in particular by a squeezing device carried by a head of a robot other than that activating the vibrating mallet, or by a second head carried by the robot activating the vibrating mallet.

It will be possible for the flexible head of the vibrating mallet to have a U shape so as to match the external shape of the profile forming the clamp and to facilitate its placing, at the same time guiding it along the body element to be equipped. This mallet will simply fastened onto the rod of a vibrating, pneumatic tool-carrier of a type known per se, the nominal vibrating frequency of which is approximately 2,000 cycles per minute, at a compressed-air pressure of 6 bar. It will be possible for this frequency to be modified advantageously by varying the compressed-air supply pressure. The stroke of the vibrating mallet is approximately 30 mm. The pneumatic or electric, vibrating tool-carrier is of the type having vibrating blocks on which files or abrasive elements are frequently mounted.

In a preferred embodiment of the invention, the vibrating tool-carrier and the flexible-headed mallet integrally connected to the movable part of this tool-carrier will be carried by an arm of a robot and it will be possible for the method to be implemented in an entirely automated manner with the aid of this robot, programmed in a conventional manner. Here again, it will advantageously be possible to use as the robot, robots commonly employed in automobile technology and the arm of which is provided, for example, with spot-welding tongs or with a paint gun, which elements need only be replaced by a flexible-headed mallet.

The flexible-headed mallet, or the structure carrying the latter, will preferably comprise at least one element for guiding the profile, for example a guide element with a U-shaped contour in which the arms of the U may be joined together at their upper part by a removable closing element such as a pin. It will be possible for this closing element to be activated by a control means such as a jack. Two similar guide elements, arranged in a same plane on either side of the rod of the mallet, for example symmetrically relative to the latter, will preferably be provided in order to ensure the guidance of the profile in all the positions of the mallet, a robot ensuring the passage of the profile from one guide element to the other, as well as the putting in place or withdrawal of the elements for closing the guide element, as is necessary.

It will be noted that whereas the plastic material and the reinforcement of the profile were compressed in the prior art of the looped fitting of the profile, with the present method in which the profile is continuously put in place on a rim of a frame of a body starting from a predetermined point with the aid of a vibrating tool which progresses along this body element, the profile is not subjected to any stress during its putting in place. A profile can therefore be used whose length is virtually identical to that of the body element to be equipped, a consequent saving being made on raw materials and there being a consequent lack of compression of the sealing element adjoining the U-profile, which subsequently facilitates the closing of the doors or of the trunk of the vehicles. Moreover, the implementation of this method using a programmed robot ensures a better homogeneity of the fitting, and makes for an appreciable saving in terms of personnel.

It will also be noted that the use of a mallet with a vibrating head, possibly activated and controlled by a robot, makes it possible to employ profiles comprising a piece with a more closed U-section and therefore requiring greater placing forces than those for the profiles of the prior art, which ensures a better stability of these clamps on their support.

Moreover, the implementation of the method according to the invention using a profile of a precise length, starting from a predetermined point of the body and from a marked location of the profile, makes it possible to use profiles in which the part forming a U-section clamp can have a variable opening depending on its length and adapted to the localized thicknesses of its support, at different locations of the door frame.

It will be possible to use any type of profile in which the length of the reinforcement does not vary over time, under the stress of the contraction of the coating material with which it is sheathed. By way of example, the profile forming the subject of the application for a French certificate of addition No. 2,626,054 will be mentioned, in other words a profile comprising a metal reinforcement with a U-shaped cross-section, sheathed with at least one plastic or elastomeric material, in which is embedded at least one virtually inextensible wire in the intermediate zone between the profile and the associated sealing element in the region of the center axis of the profile, said metal reinforcement resulting from the shaping into a U-shaped channel of a plane reinforcement comprising a succession of parallel bands of the same dimensions joined to the contiguous bands by two lateral spacers arranged symmetrically relative to the plane of symmetry of the U, to the exclusion of any central spacer arranged in the plane of symmetry.

The presence of the lateral spacers of such a reinforcement between the contiguous bands of the profile, combined with the presence of an inextensible wire embedded in the plastic material, ensures the undeformability of the profile over time. Such a profile, of a length of 3.3 meters, manufactured and marketed by the Applicant, thus preserves over time a constant length of within ±5 millimeters.

It is, moreover, not necessary, within the scope of the present invention, for the inextensible wire of the above profile to be situated between the profile and the sealing element, and it could equally well be arranged on the side of the profile opposite that on which the sealing member is situated. It is also possible to use two inextensible wires, arranged respectively along each of the arms of the U of the cross-section of the profile.

Other types of U-section profiles with a nonextendable reinforcement and of a substantially constant length over time, whether known from the prior art or not, could, of course, be used in the implementation of the invention.

BRIEF DESCRIPTION OF THE DRAWINGS

The invention will be described below in more detail with reference to the attached diagrammatic drawings which imply no limitation. In these drawings.

DETAILED DESCRIPTION OF THE PREFERRED EMBODIMENTS

Figure 1:
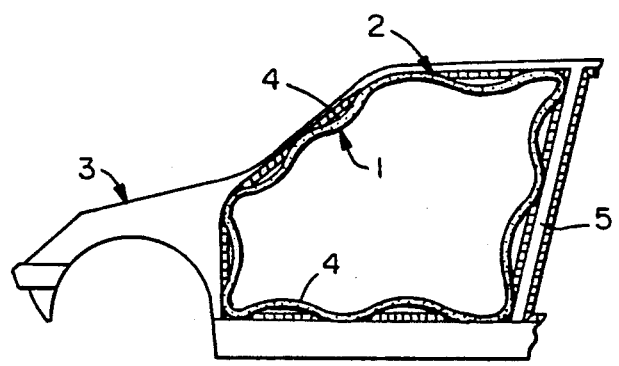
FIG. 1 is a view in elevation of a door frame illustrating the looped fitting of a ring profile of the prior art.

Reference will first be made to FIG. 1 which illustrates the traditional "looped" fitting of a profile 1 onto a door frame 2 of a motor vehicle body 3.

As explained above, the profile, the ends of which are assembled so that it forms a ring and the length of which is greater than that of the door frame to be equipped, is first positioned manually, at a plurality of locations 4, by clamping onto the projecting rim of the door frame. Between the various points 4, the profile is then fixed by force onto the same rim using a mallet, which causes the covering material of the profile to be compressed. These operations take a relatively long time and are relatively expensive since they are carried out manually by a worker and since they make use of a length of profile greater than that which would normally be necessary.

Figure 2:
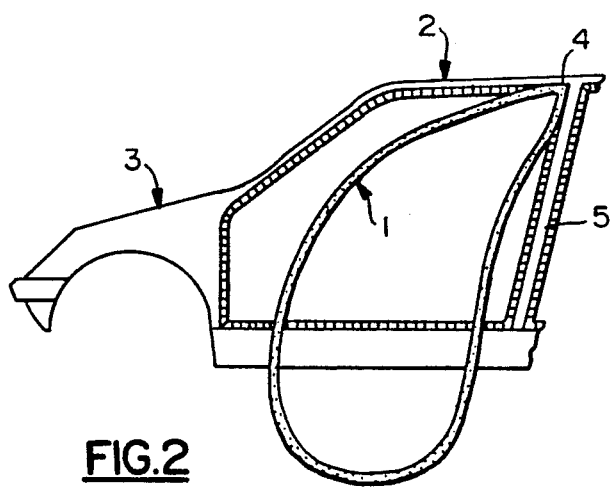
FIG. 2 is a view similar to FIG. 1, illustrating the placing, according to the present invention, at a determined location of the door frame, of a predetermined part of the ring profile.
Figure 3:
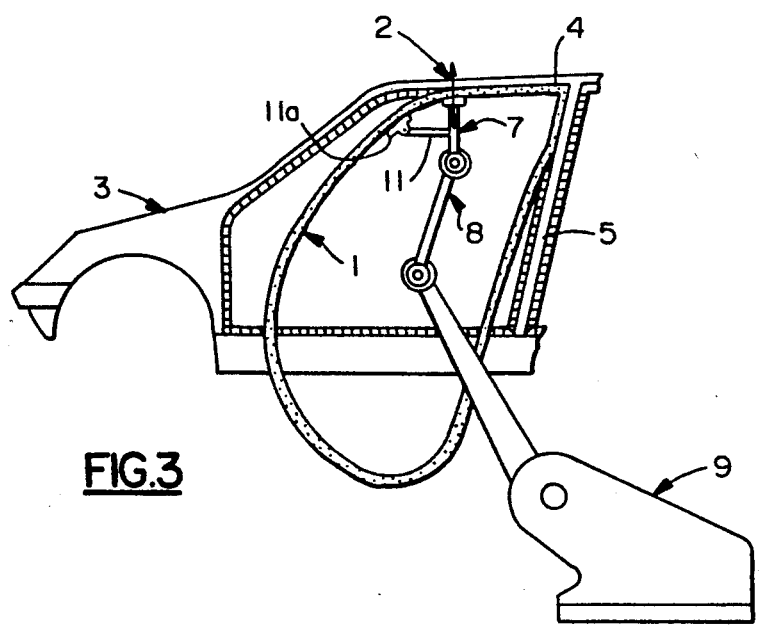
FIG. 3 illustrates the next stage of the continuous putting in place of the profile on the rim of the door frame, using a vibrating flexible-headed mallet carried by an articulated arm of a programmed robot.

According to the invention (see FIGS. 2 et seq. in which the members already described are designated by the same reference numerals), a U-section profile 1 is used, arranged in a ring, the length of which is substantially equal to that of the door frame to be equipped and the metal reinforcement of which is such that it cannot deform, by elongating or compressing, in particular under the stress of the covering material of this reinforcement, when the latter contracts with aging and as a result of thermal shocks after the profile has been put in place on the door frame.

A predetermined, and possibly marked, part of the profile 1 is positioned, initially, on the rim of the door frame at a single point 4 of the latter, which will advantageously be situated in the top corner of this frame contiguous to the central pillar 5 of this body. Using a mallet 7 with a vibrating head, carried for example by an articulated arm 8 of a robot 9, programmed so as to displace continuously the head of the mallet 7 along the projecting rim to be equipped, the profile 1 is subsequently fastened onto this projecting rim, continuously, from the point 4 as far as the joining point 10 of the two ends of the profile, and then, in the reverse direction, again starting from the point 4 as far as the other end of the profile. It will advantageously be possible for an arm 11, on which is articulated a U-section head 11a, to be carried by the arm 8 so as to guide for bringing the profile 1 into position on its support.

Figure 4A:
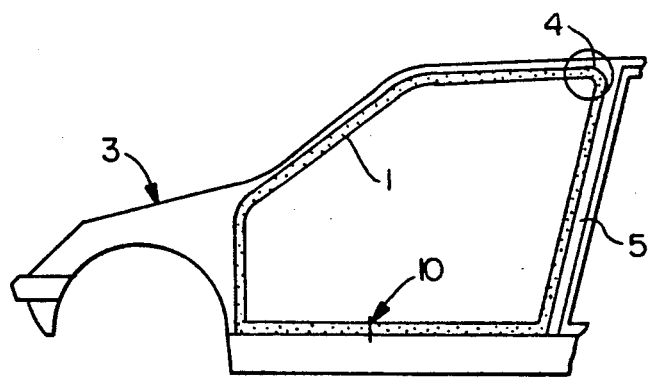
FIGS. 4a and 4b are views similar to FIGS. 3 and 4, illustrating the position of the assembled ends of the seal on the door frame, after the profile has been put in place.
Figure 4B:
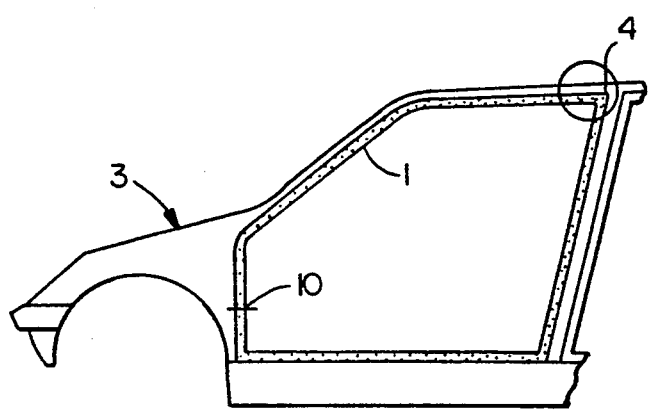

As can be seen in FIGS. 4a and 4b, the profile can thus be placed over the entire periphery of the door frame, the joining point 10 of the ends of the profile preferably being situated, at the end of the fastening process of the profile, either in the center of the lower part of the door frame (FIG. 4a) or in the center of the part of this frame arranged facing the central pillar 5 (FIG. 4b).

It will be noted that it is not necessary in all cases to impart to the vibrating mallet a two-stage movement, starting first from the initial fastening point of the profile onto the body frame as far as one end of this profile, in order to return subsequently to the starting point and then act on the other part of the profile, in the reverse direction to the initial movement, as far as the other end of the profile. Indeed, with body frames having an appropriate contour, it is possible, starting from the initial fastening point of the profile onto the projecting body element, to put the profile in place on this element using the vibrating mallet, by displacing this mallet in a single direction so that it follows a complete path in a single direction in order to return to its starting point.

It is not necessary likewise when the ends of the profile are joined together to form a ring, for the vibrating mallet to start from the initial fastening point of the profile onto the projecting body element and stop at one end of the profile, but instead it can also stop at any point of the ring in order to return to its starting point and subsequently act in the reverse direction as far as the point at which it previously stopped in its travel.

Figure 5:
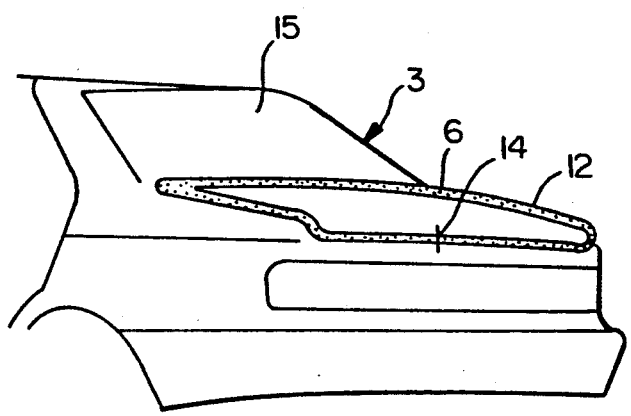
FIG. 5 is a view similar to that in FIG. 4, in the case of a trunk opening.

The method according to the invention does not apply only to door frames but, as indicated above, can also be used, with the same advantages, for putting a U-section profile 12, adjoining a deformable sealing element, in place on the projecting rim of a motor vehicle trunk opening 13 (FIG. 5). In this case, the initial fastening point 6 of a predetermined and possibly marked part of the profile 12 onto the projecting rim of the opening of the trunk will be situated in one of the corners of the opening 13 closest to the rear window 15 of the vehicle, while the joining point 14 of the ends of the profile 12 will preferably be situated substantially at the center of the part of the rim of the opening 13 of the trunk furthest from the rear window 15.

Figure 6A:
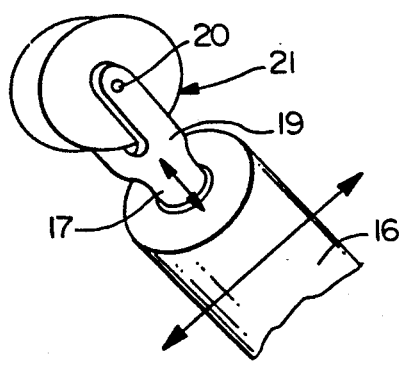
FIGS. 6a and 6b are views on a larger scale of two types of vibrating mallets carried by the arm of a robot, used in the implementation of the invention.
Figure 6B:
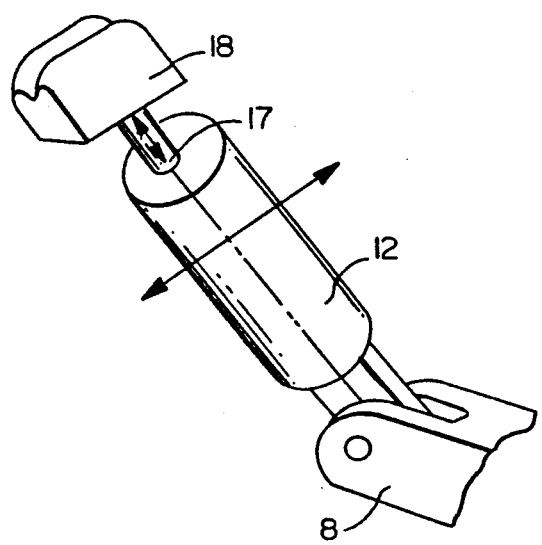

As shown in FIG. 6b, the end of the arm of the robot supports the working element 16 in the same manner as those which, on robots used in the automobile industry, carry spot-welding tongs intended to assemble the elements of the body. On the rod 17 of this vibrating body will, for example, be fastened a head 18 made of a flexible material and whose part coming into contact with the profile to be put in place will preferably have a U-section matching the external shape of the profile (FIG. 6b) forming the fastening clamp.

Alternately, the rod 17 will terminate in a fork joint 19, carrying a spindle 20 on which a wheel 21 made of a flexible material will be mounted so as to rotate freely, the edge of the wheel being scalloped into a U in order to match the external shape of the profile to be put in place (FIG. 6b).

Figure 7:
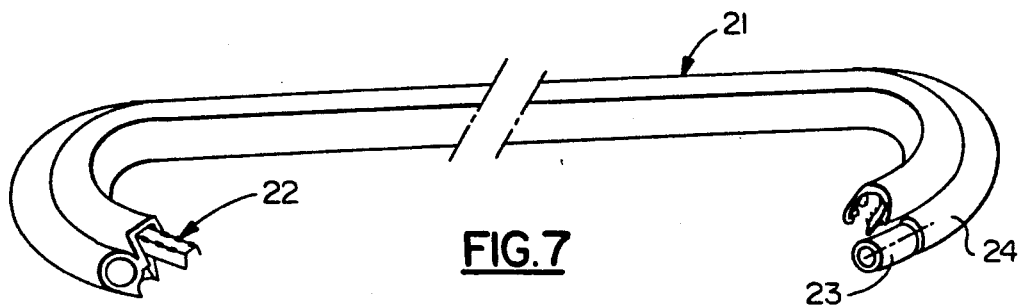
FIG. 7 illustrates a mode of assembling the ends of the profile using clips.

It will be possible for the ends of the profile 1 to be assembled to form a ring by any means known from the prior art, for example by engaging a connecting clip 22 inside the contiguous ends and by adhesively bonding or welding the terminal cross-sections of these ends to each other, for example using an adhesive of the cyanoacrylate type (FIG. 7). Similarly, a tubular connecting piece 23 will be engaged into the two ends of the tubular sealing element 24 adjoining the profile 1, and these ends will likewise be integrally connected by adhesive bonding or welding.

Figure 8:
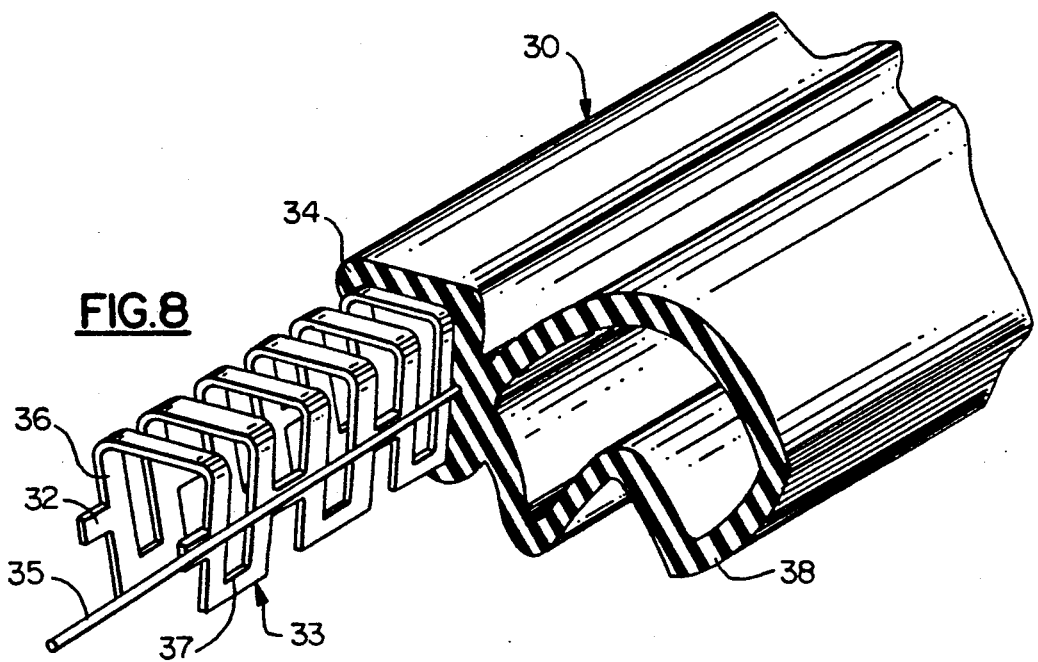
FIG. 8 is a diagrammatic view of a U-section profile which is particularly well suited to the implementation of the invention.

For the implementation of the invention it will be possible to use any U-section profile having a metal reinforcement and whose structure is such that its length is substantially constant over time and that it cannot contract or elongate, in particular when the metal reinforcement is stressed by the polymeric material coating it. By way of example, a profile 30 of this type, described in FR-A No. 2,626,054, is shown in FIG. 8. It comprises a metal reinforcement 33 with a U cross-section, sheathed with a plastic material 34 and in which is arranged at least one virtually inextensible wire 35. The metal reinforcement 33 results from the shaping into a U-shaped channel of a plane reinforcement comprising a succession of perforated rectangular elements having large sides 36 perpendicular to the plane of symmetry of the U and small sides 37 parallel to this plane of symmetry, the rectangular elements being joined to the contiguous elements by two spacers 32 parallel to the plane of symmetry of the U. Such a reinforcement cannot be elongated or compressed, and the inextensible wire 35 embedded in the covering material opposes the contraction of the latter. As shown, the wire 35 can be arranged in the intermediate zone between the profile and the associated sealing element 38, but it could equally well be embedded in the plastic material coating the arm of the U not contiguous to the sealing element 38, or the base of the U. It is also possible to use more than one inextensible wire 35 and thus to associate such a wire with each of the arms of the U.

Figure 9:
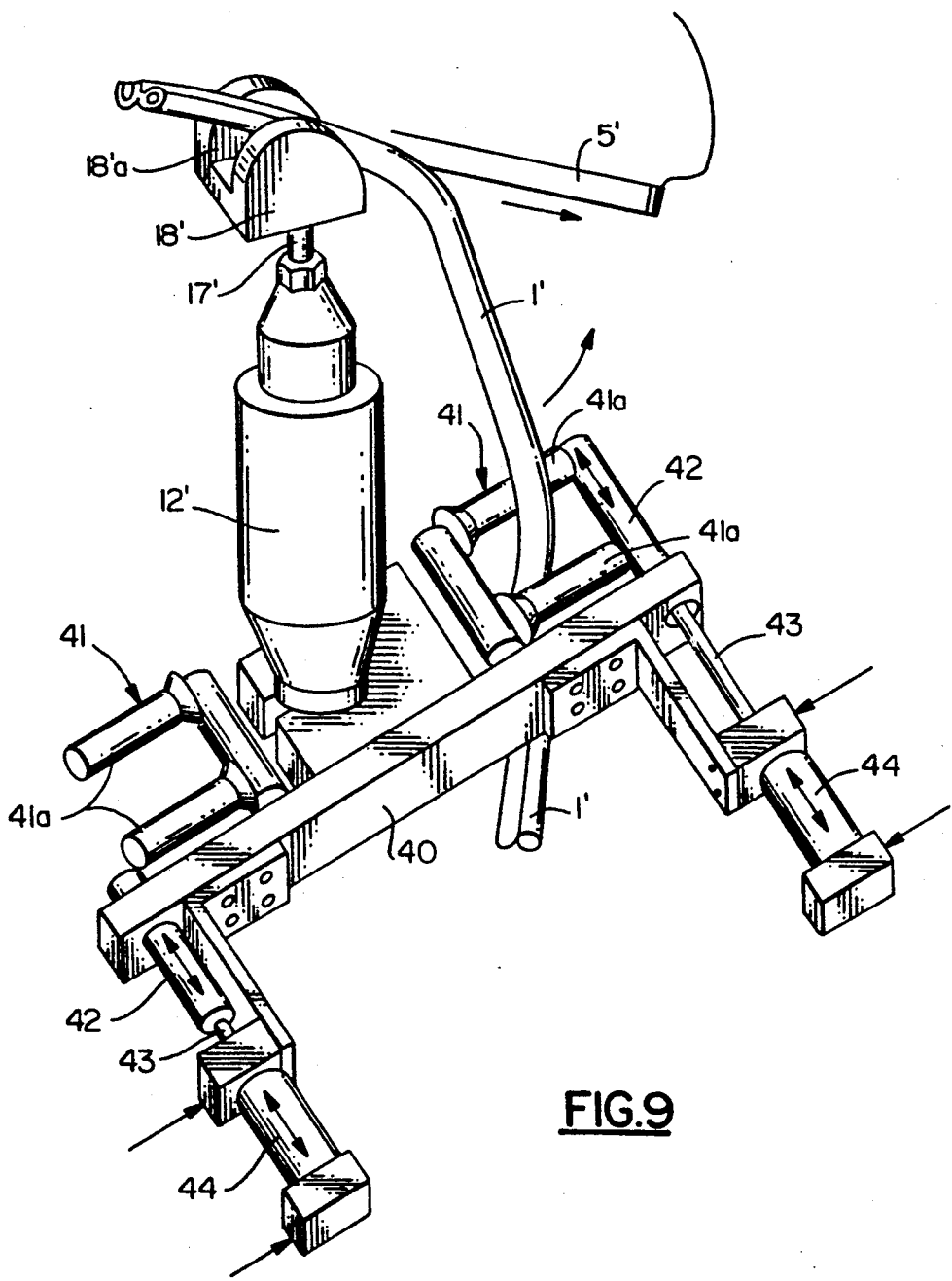
FIG. 9 shows a preferred form of a device for the implementation of the method according to the invention, equipped with a system for guiding the profile.

A preferred embodiment of a device for the implementation of the method according to the invention will now be described with reference to FIG. 9.

In this figure, the members already described above are designated by the same reference numerals given the suffix '.

Here again a profile 1' is intended to be put in place on a projecting element of a vehicle frame, at the level of the central pillar 5' of the body. The vibrating head 18', made of a flexible material, of the mallet is carried by the rod 17' of a vibrating body 12' and it has a recess 18a' for fitting over the profile.

The rigid framework 40 carrying the vibrating body 12' supports, arranged symmetrically on either side of this body 12', two elements 41 for guiding the profile, having a U-shaped contour, the tops of the arms 41a of which can be joined together by a movable closing member 42 carried by the rod 43 of a hydraulic or pneumatic jack 44.

The profile 1 is engaged between the arms 41a of the most appropriate guide element 41 with a view to following closely the movements of the head 18' of the mallet and to being brought into alignment with the recess 18'a of this head. When the position of the head 18' requires it, the robot unlocks the closing element 42 from this guide element 41, extracts the profile 1 from it and engages the profile in the second guide element 41, which it then locks by means of the second closing element 42.

The method of the invention applies, of course, to the putting in place on a projecting rim of a motor vehicle body of any other U-section profile having a metal reinforcement whose length remains substantially invariable over time.

We claim:

1. A method for placing and securing a profile having a U-shaped cross section onto a projecting rim of a frame of a vehicle body, comprising:

a) providing a length of the profile that is substantially equal to the length of the projecting rim, said profile comprising a substantially non-extendable reinforcement sheet with a resilient covering material;

b) fastening a predetermined section of the profile onto a predetermined location on the projecting rim; and c) vibrating a flexible headed mallet against the profile over substantially the complete length thereof thereby securing the profile onto the rim, including the steps of i) postponing the mallet adjacent said predetermined location on the projecting rim, ii) vibrating the mallet against the profile while moving the mallet in a first direction extending away from said predetermined location on the rim thereby securing a first portion of the profile thereonto, iii) repositioning the mallet adjacent said predetermined location on the projecting rim, and iv) vibrating the mallet against the profile while moving the mallet in a second direction extending away from said predetermined location on the rim thereby securing a second portion of the profile onto the rim.

2. The method as claimed in claim 1, applied to the fastening of a U-shaped profile in place on the projecting rim of a motor vehicle door frame (2) wherein said predetermined location (4) of the rim is situated in a top corner of the rim, contiguous with a corresponding central pillar (5) of the body frame.

3. The method as claimed in claim 1, applied to a fastening of a U-shaped profile in place on a projecting rim of a motor vehicle trunk opening (13), wherein said predetermined location (6) of the rim is situated in either of two corners of the trunk opening which are closest to a rear window (13) of the vehicle body.

4. The method as claimed in claim 1, applied to the fastening of a U-shaped profile in place on a projecting rim of a motor vehicle door frame, wherein the profile has two ends joined together at a joining point and, at completion of step (c), the joining point of the two ends of the profile is situated at a base of the door frame.

5. The method as claimed in claim 1, applied to the fastening of a U-shaped profile in place on a projecting rim of a motor vehicle trunk opening, wherein the profile has two ends joined together at a joining point and, a completion of step (c), the joining point of the two ends of the profile is situated on an edge of the opening arranged at a rear of the vehicle body.

6. The method as claimed in claim 1, wherein said vibrating flexible-head mallet (7) is carried by an arm (8) of a programmed robot (9).

7. The method as claimed in claim 1, wherein said vibrating mallet has a U-shaped flexible head (18) capable of matching the external shape of the profile.

8. The method as claimed in claim 1, wherein said vibrating mallet has a head consisting of a flexible wheel (21), a recessed U-shaped edge of which is capable of matching the external shape of the profile.

9. The method as claimed in claim 1, applied to the fastening, on a projecting rim of a motor vehicle body, of a weatherseal comprising a U-shaped profile and a deformable sealing member integrally connected to one arm of the U, wherein said profile comprises a metal reinforcement (33) with a U-shaped cross-section and sheathed with at least one plastic material (34) in which is embedded at least one virtually inextensible wire (35) arranged parallel to a plane of symmetry of the metal reinforcement of the U, this reinforcement resulting from the shaping into a U-shaped channel of a plane reinforcement comprising a succession of parallel bands of the same dimensions, joined to the contiguous bands by two lateral spacers arranged symmetrically relative to the plane of symmetry of the U, to the exclusion of any central spacer arranged in the plane of symmetry.

10. A method according to claim 1, wherein step (c) includes the further steps of:
   v) engaging the profile with a first guide member, located on a first lateral side of the mallet,
   vi) using said first guide member to guide the profile toward the rim and the mallet while moving the mallet in said first direction,
   vii) disengaging the profile from the first guide member,
   viii) engaging the profile with a second guide member, located on a second lateral side of the mallet, and
   ix) using said second guide member to guide the profile toward the rim and the mallet while moving the mallet in said second direction.

11. A method according to claim 10, wherein each of the guide members comprises a frame extending completely around a respective interior, and the frame of each guide member includes a movable closure element, and wherein:
   the step of engaging the profile with the first guide member includes the steps of
   i) moving the closure element of the first guide member to an open position to allow access to the interior thereof,
   ii) moving the first guide member to position the profile in the interior of the first guide member, and
   iii) moving the closure element of the first guide member to a closed position to capture the profile in the interior of the first guide member; and
   the step of engaging the profile with the second guide member includes the steps of:
   i) moving the closure element of the second guide member to an open position to allow access to the interior of the second guide member,
   ii) moving the second guide member to position the profile in the interior of the second guide member, and
   iii) moving the closure element of the second guide member to a closed position to capture the profile in the interior of the second guide member.

12. A method for placing and securing a profile onto a projecting rim of a frame of a vehicle body, the profile having a U-shaped cross section and forming a continuous loop, the method comprising:
   a) providing a length of the profile substantially equal to a length of the projecting rim, said profile comprising a substantially non-extendable reinforcement sheet with a resilient covering material;
   b) fastening a predetermined section of the profile onto a predetermined location on the projecting rim;
   c) vibrating a flexible headed mallet against the profile over substantially the complete length thereof thereby securing the profile onto the rim, including the steps of
   i) positioning the mallet adjacent said predetermined location on the projecting rim,
   ii) vibrating the mallet against the profile while moving the mallet in a first direction, extending away from said predetermined location on the rim, to a further predetermined portion of the profile thereby securing a first section of the profile onto said rim,
   iii) repositioning the mallet adjacent said predetermined location on the projecting rim, and
   iv) vibrating the mallet against the profile while moving the mallet in a second direction, extending away from said predetermined location on the rim, to said further predetermined portion of the profile thereby securing a second section of the profile onto said rim.

13. A method for placing and securing a profile onto a projecting rim of a frame of a vehicle body, the profile having a U-shaped cross section and forming a continuous loop, the method comprising:
   a) providing a length of the profile substantially equal to a length of the projecting rim, said profile comprising a substantially non-extendable reinforcement sheet with a resilient covering material;
   b) fastening a predetermined portion of the profile onto a predetermined location on the projecting rim;
   c) vibrating a flexible headed mallet against the profile over substantially the complete length thereof thereby securing the profile onto the rim, including the steps of
   i) positioning the mallet adjacent said predetermined location on the projecting rim, and
   ii) continuously moving the mallet in a first direction from said predetermined location on the rim and completely around the loop formed by the profile until the mallet returns to said predetermined location on the rim, while vibrating the mallet against the profile thereby securing the profile onto the rim.

14. A method according to claim 13, wherein step (c) including the further steps of:
   v) engaging the profile with a guide means; and
   vi) using the guide means to guide the profile toward the rim and the mallet while moving the mallet around the loop formed by the profile.

15. A method according to claim 14, wherein the guide means comprises a frame extending completely around an interior area, and the frame of the guide means includes a movable closure element, and wherein the step of engaging the profile with the guide means includes the steps of:
   i) moving the closure element of the guide means to an open position to provide access to the interior of the guide means;
   ii) moving the guide means to position the profile in the interior thereof, and
   moving the closure element of the guide means to a closed position to capture the profile in the interior of the guide means; and
   the step of disengaging the profile from the guide means includes the steps of
   i) moving the closure element of the guide means to the open position, and
   ii) moving the guide means away from the profile to remove the profile from the interior of the guide means.

16. The method as claimed in one of claims 1, 12, or 13, wherein the fastening of the predetermined portion of the profile onto the predetermined location of the projecting rim is performed manually using a separate tool from the vibrating-head mallet.

17. The method as claimed in claim 1, 12, or 13, wherein the fastening of the predetermined portion of the profile onto the predetermined location of the projecting rim is performed using the vibrating-head mallet.

* * * * *

UNITED STATES PATENT AND TRADEMARK OFFICE
CERTIFICATE OF CORRECTION

PATENT NO. : 5,199,154
DATED : April 6, 1993
INVENTOR(S) : Gerard Mesnel, et al.

It is certified that error appears in the above-identified patent and that said Letters Patent is hereby corrected as shown below:

```
        Column 2, line 64:   "revers"  should read
--reverse--
        Column 3, line 10:   after "simply"  insert --be--
        Column 5, line 63:   after "to" insert --precede
it in its displacement, the head 11a forming a--
        Column 5, line 65:   after "profile" insert --1--
```

Signed and Sealed this

Fourth Day of January, 1994

*Attest:*

BRUCE LEHMAN

*Attesting Officer*     *Commissioner of Patents and Trademarks*